United States Patent [19]

Allen, Jr.

[11] 4,301,686
[45] Nov. 24, 1981

[54] MASS RATE OF FLOW METER WITH IMPROVED MAGNETIC CIRCUIT

[75] Inventor: Malcolm H. Allen, Jr., Melrose, Mass.

[73] Assignee: General Electric Company, Wilmington, Mass.

[21] Appl. No.: 84,389

[22] Filed: Oct. 12, 1979

[51] Int. Cl.³ .............................................. G01F 1/80
[52] U.S. Cl. ................................................. 73/861.35
[58] Field of Search ........... 73/194 M, 231 R, 231 M, 73/861.03, 861.35, 861.36

[56] References Cited

U.S. PATENT DOCUMENTS

| | | | |
|---|---|---|---|
| 3,071,000 | 1/1963 | Cooper, Jr. | 73/861.36 |
| 3,164,017 | 1/1965 | Karlby et al. | 73/194 |
| 3,166,936 | 1/1965 | Fisher et al. | 73/231 |
| 4,056,976 | 11/1977 | Hildebrand et al. | 73/231 |

Primary Examiner—Herbert Goldstein
Attorney, Agent, or Firm—I. David Blumenfeld

[57] ABSTRACT

A mass rate of flow meter with a first magnet and sensing coil for detecting the passage of an unrestrained rotor past the sensing coil. The position of a restrained turbine reactor is sensed by locating an axially extending magnetic flux linkage near the periphery of the turbine with an extension that is disposed in an axially overlapping relationship with a magnet that extends from the periphery of the rotor. The axial overlap produces a radial air gap that is relatively insensitive to the effects of mechanical vibration and thermal expansion.

4 Claims, 4 Drawing Figures

MASS RATE OF FLOW METER WITH IMPROVED MAGNETIC CIRCUIT

BACKGROUND OF THE INVENTION

This invention relates to mass rate of flow meters of the angular momentum type having a swirl generator for imparting swirl to the measured fluid stream and a torque balance reaction generator for removing the imparted swirl. More particularly, this invention relates to such a meter having an improved readout system for indicating the mass rate of flow.

This invention is particularly adapted for use in a mass rate of flow meter which utilizes a spring-restrained turbine as the torque balance reaction generator. One such mass rate of flow meter is depicted in U.S. Pat. No. 4,056,976 issued Nov. 8, 1977 and titled Mass Rate of Flow Meter, which patent is assigned to the same assignee as the present invention. This meter includes a housing that defines a fluid passage that extends along a longitudinal axis through the housing and that has an input port and an output port located on the axis. A swirl generator is located adjacent the input port to impart a substantially constant angular velocity to an entering fluid stream. As the fluid leaves the swirl generator, it passes through an axially displaced, unrestrained rotor that rotates about the axis. The angular velocity of the rotor accurately represents the angular velocity of the fluid stream as it leaves the rotor and passes through an axially spaced, spring-restrained turbine. The angular momentum of the fluid stream angularly displaces the turbine about the axis and against the bias of its restraining spring. Under steady state conditions, this deflection of the turbine is proportional to the mass rate of flow.

In a spring-restrained flowmeter, the rotor carries two circumferentially and longitudinally displaced bar magnets. The first magnet is disposed on the input end of the rotor and is circumferentially poled. A first sensing coil assembly in a transverse plane through the first magnet is radially spaced from the magnet and isolated from the fluid flow. Each time the first magnet passes the first sensing coil, it induces a "start" voltage pulse in the coil that indicates the passage of a predetermined point on the rotor past a predetermined point on the housing.

The second magnet is at the exit end of the rotor and diametrically opposed to the first magnet. An axially disposed, longitudinally extending bar of a highly permeable material, such as soft iron, mounts on the periphery of the turbine. The axial spacing between the rotor and the turbine interposes an axial air gap between the bar and the second magnet when they align. A second sensing coil assembly, that is isolated from the fuel flow, is coaxial with and longitudinally coextensive with the second magnet and the bar. Each time the second magnet passes the bar, the flux that the bar couples to the second sensing coil assembly changes and induces a "stop" voltage pulse in the second sensing coil. As described in the foregoing U.S. Pat. No. 4,056,976, timing circuits convert the start and stop pulses from the first and second sensing coil assemblies into an indication of the mass rate of flow through the meter.

There are, therefore, two separate, magnetic circuits in this mass rate of flow meter. The first, defined by the first magnet and the first sensing coil assembly, includes a radial air gap. The second, including the second magnet and the highly permeable bar, includes an axial air gap. During use of the mass rate of flow meter, there are several influences that tend to change the lengths of these air gaps, although to different degrees. Two such influences are vibrational forces and thermal expansion.

A typical application for such a flowmeter is in an aircraft for measuring the mass rate of flow of fuel to an engine. The engine and air frame are sources of mechanical vibrations. Also, the fuel that passes through the flow meter is subject to pressure pulsations that introduce other mechanical vibrations. These vibrations have radial and axial components that are coupled to the flowmeter and produce corresponding radial and axial forces that act on all the elements in the flowmeter. However, with the construction of the flowmeter, including the methods for mounting the rotor and turbine on a shaft for rotation, the individual elements are more stable in a radial direction than they are in an axial direction and, therefore, are less likely to vibrate in a radial direction.

In addition to vibrationally induced forces, the elements also are subjected to the forces of thermal expansion. When an aircraft is flown, the temperature of the fuel varies widely. Any elements that contact the fuel, including the rotor and the turbine of the flowmeter, are therefore subject to these temperature variations and, therefore, to thermal expansion. Both the rotor and turbine are characterized by material dimensions in the radial direction (i.e., radial thickness) that are significantly less than those in the axial direction (i.e., axial length). Thus, the radial effects of thermal expansion forces are less than the axial effects.

During operation of the flowmeter, the radial forces that are produced by vibrations and thermal expansion do not vary the length of a radial air gap sufficiently to affect the ability of the first sensing coil assembly to generate detectable pulses on a reliable basis. However, the axial forces that are produced by vibrations and thermal expansion can, in some environments, adversely affect the signal-to-noise ratio of the signal that is produced in the second sensing coil. Moreover, the problems can be increased depending upon the axial motion that is permitted by manufacturing tolerances. It is possible, under some circumstances, for the signal level from the second sensing coil assembly to reach undetectable levels and, under other circumstances, for the noise to reach a level at which it is detected as a signal. Either situation leads to erroneous flowmeter readings.

SUMMARY

Therefore, it is an object of this invention to provide an improved mass rate of flow meter with a reliable readout system.

Another object of this invention is to provide an improved mass rate of flow meter with a reliable readout system that exhibits a reduced sensitivity to the effects of thermal expansion and mechanical vibrations.

In accordance with this invention the above and further objects are achieved in a mass rate of flow meter of the angular momentum type that utilizes a spring-restrained turbine as a torque balance reaction generator by supporting a magnet means from an end of an unrestrained rotor in an axially overlapped relationship with a magnetic linkage means from the turbine. The magnet and the magnetic linkage means travel in non-interfering, concentric paths. The resulting radial air gap in the magnetic current of the coil assembly that senses the passage of a predetermined point on the rotor past a predetermined point on the turbine is less sensitive to the effects of vibrations and thermal expansion than the prior axial air gap.

This invention is pointed out with particularity in the appended claims. The above and further objects and advantages of this invention may be better understood by referring to the following description taken in conjunction with the accompanying drawings.

DESCRIPTION OF AN ILLUSTRATIVE EMBODIMENT

Figure 1:
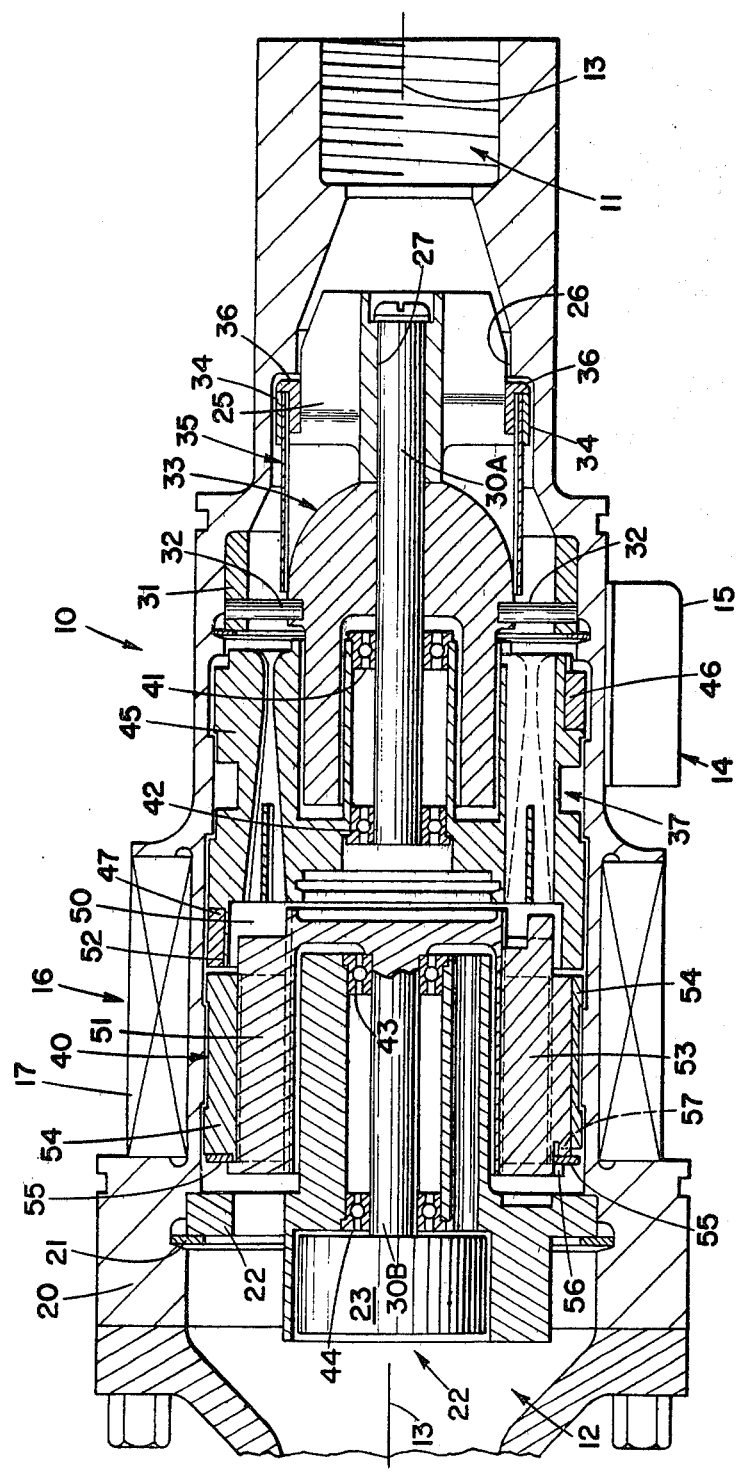
FIG. 1 is a longitudinal view, in cross section, of a mass rate of flow meter embodying this invention.

FIG. 1 illustrates an exemplary flowmeter that incorporates this invention. It comprises a housing 10 having an inlet port 11 and an outlet port 12 at the ends of the housing 10 which, with other elements of the flowmeter, defines a generally annular passage for a fluid, such as aircraft fuel. The passage is generally disposed along a longitudinal axis 13. A first sensing coil assembly 14 generates first timing, or start, pulses and is affixed to the housing 10. The assembly 14 has a longitudinal axis that is perpendicular to the axis 13 and is secured in a shield 15.

A second sensing coil assembly 16 generates second, or stop, timing pulses and is also affixed to the housing 10. The assembly 16 has a longitudinal axis that is coincident with the axis 13 and includes a sensing coil 17 that is disposed at a flange 20 at the outlet port 12. Conductors from both the first sensing coil assembly 14 and the second sensing coil assembly 16 terminate at a connector assembly (not shown). Both the coil assemblies 14 and 16 are isolated from the flow of a fluid through the housing 10.

A first inner, or turbine, assembly is radially positioned on the housing 10 by a housing end flange 20 and an end assembly 22 and is axially positioned by a retaining ring 21. The end assembly 22 also supports a spring mechanism 23. At the inlet port 11, a second inner, or rotor, assembly includes a flow straightener 24 that comprises a plurality of longitudinally extending, circumferentially spaced vanes 25. The flow straightener 24 is positioned in a tapered bore 26 and is mounted to one end of a shaft 30A. An aligned shaft 30B is supported by the end assembly 22 and lies on the longitudinal axis 13.

A forward strut element in the rotor assembly comprises a stationary annulus 31 and a plurality of struts 32 that extend inwardly from the annulus 31 and that support a swirl generator 33. The annulus 31 radially positions the rotor assembly and coacts with a retaining ring 31A to axially position the rotor assembly on the housing 10. The swirl generator 33 supports the shaft 30A. A flanged ring 34 is carried on the outer surface of the vanes 25 and supports one end of a variable diameter conduit 35 that includes a plurality of spring fingers that encircle the swirl generator 33. The conduit 35 acts as a flow responsive valve. A second ring 36 clamps the conduit 35 and the ring 34 to the vanes 25. This ring 36 also coacts with the housing 10 to radially position the shaft 30A.

A rotor 37 and a turbine 40 are journaled on shafts 30A and 30B respectively in an axially spaced relationship. Thrust bearings 41 and 42 support and position the rotor 37 on the shaft 30A; thrust bearings 43 and 44, the turbine 40 on the shaft 30B. A flat band, helical spring (not shown) in the spring mechanism 23 is clamped between the turbine 40 and the shaft 30B to restrain rotation of the turbine 40 about the shaft 30B.

An outer annulus 45 on the rotor 37 supports a group of permanent bar magnets 46 in the periphery of the rotor 37. These magnets are disposed to produce a north-south magnetic axis along a chord near the periphery of the rotor 37. Each time the magnets 46 rotate past the sensing coil assembly 14, a start pulse is induced in the coil assembly 14 that indicates the passage of a predetermined point on the rotor 37 (i.e., the location of the magnets 46) past a predetermined point on the housing 10 (i.e., the location of the coil assembly 14).

Figure 2:
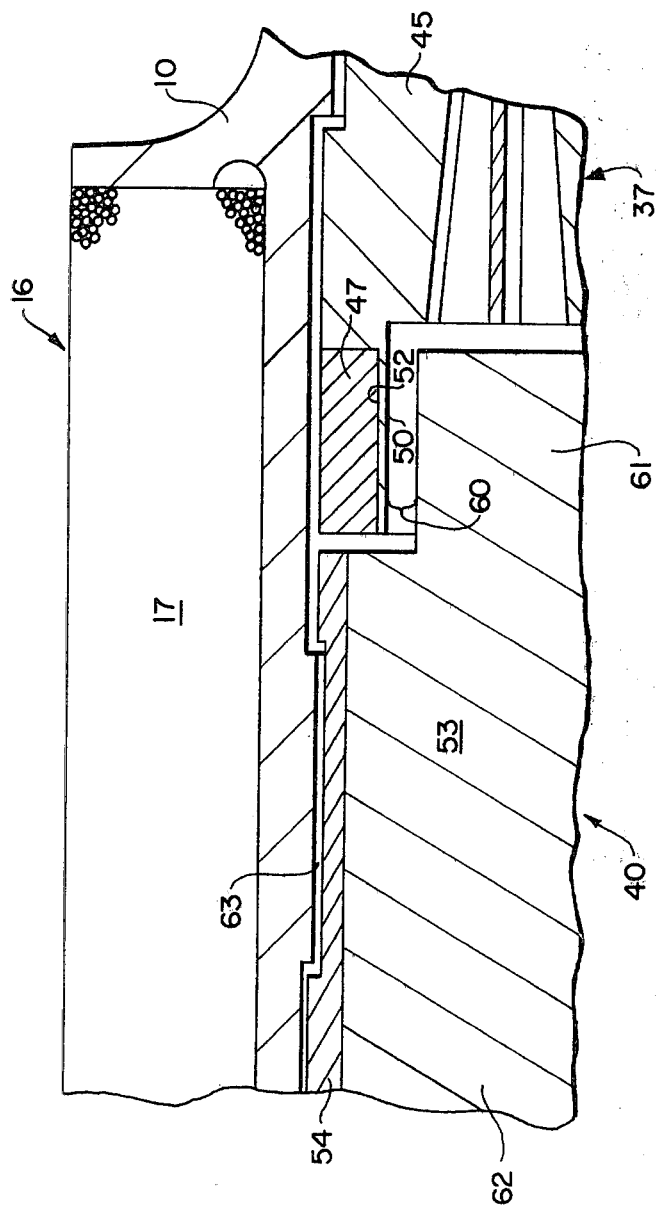
FIG. 2 is an enlarged cross-sectional view of a portion of the mass rate of flow meter shown in FIG. 1.
Figure 3:
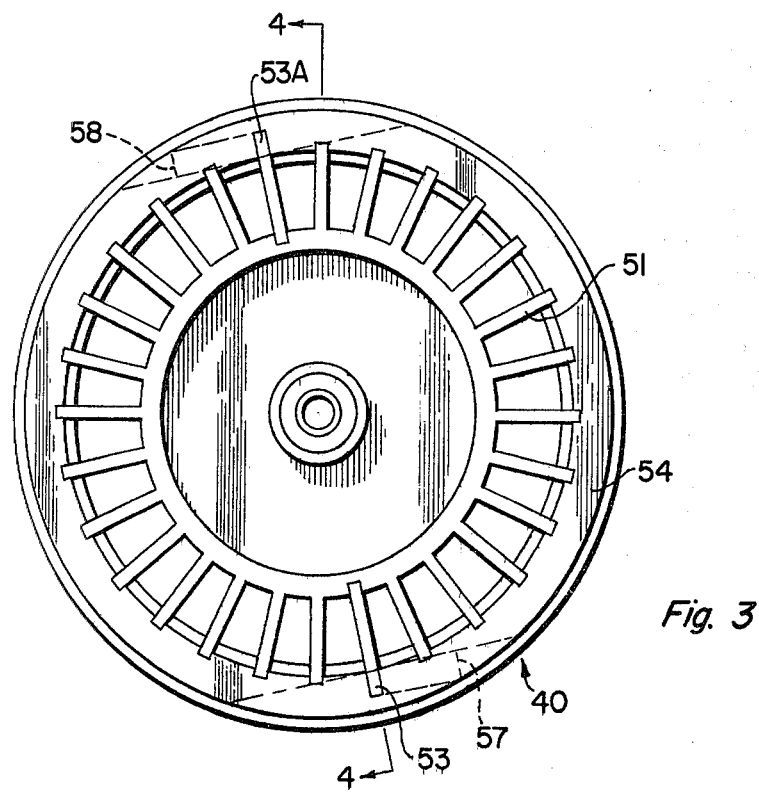
FIG. 3 is an end view of a turbine that is shown in FIG. 1.

Referring to FIGS. 1 and 2, another group of permanent magnets 47 also mounts to the outer annulus 45 of the rotor 37. More specifically, the annulus 45 has an annular extension 50 that extends toward and overlaps a portion of the turbine, specifically the ends of turbine blades 51 on the turbine. Longitudinal grooves 52 are cut in the outer surface of the extension 50 to carry longitudinally extending, closely spaced, radially poled magnets 47. These magnets 47 also produce a field with a north-south magnetic axis lying along a chord near the periphery of the rotor 37.

Now referring to FIGS. 1 through 4, in addition to the turbine blades 51, the turbine 40 carries an exciter blade 53 of a permeable material and a diametrically opposed, non-permeable, balancing blade 53A. An outer band, or shroud, 54 fits over the turbine blade 51, the exciter blade 53, and 53, and the balancing blade. The band 54 engages a flux collecting ring 55 of a permeable material between the band 54 and a radial extension 56 on the turbine 40. The ring 55 bears against a tab 57 from the exciter blade 53 and a similar tab 58 from the balancing blade.

Each time the magnets 47 pass the exciter blade 53, flux linkages are coupled to the coil 17 through the exciter blade 53 and the flux collection ring 55 and induce an electrical stop pulse in the sensing coil 17 that indicates the passage of another predetermined point on the rotor 37 (i.e., the location of the magnet 47) past a predetermined point on the turbine (i.e., the position of the exciter blade 53). The time between the start and stop pulses is representative of flow rate.

Referring primarily to FIG. 2, the extension 50 supports the magnets 47 so they rotate in a first circular path. An extension 61 from a main body 62 of the exciter blade axially overlaps the extension 50 and the magnets 47. However, the extension 61 moves in a second circular path that is coaxial with the path of the extension 50, so the axially overlapped portions do not interfere during operation. A notch 63 in the exciter blade 53 reduces fluid turbulence that the extension 61 might otherwise introduce if it were not notched.

The air gap between the extension 50 below the magnets 47 and the extension 61 of the exciter blade 53 and another air gap 63 between the exciter blade 53 and the ring 54 on one end and the housing 10 in the area of the coil 17 on the other end both comprise radially extending air gaps. There is no significant axial air gap. Thus, the inherent stability in the length of the radial air gaps is achieved so that the length of air gaps is less sensitive to fluctuation as a result of mechanical vibrations and thermal expansion. The magnets 47, although coextensive with the coil 17, do not induce any significant voltage in the coil winding 17 as the rotation of the magnets 47 does not independently produce flux changes in the annular coil 17.

Figure 4:
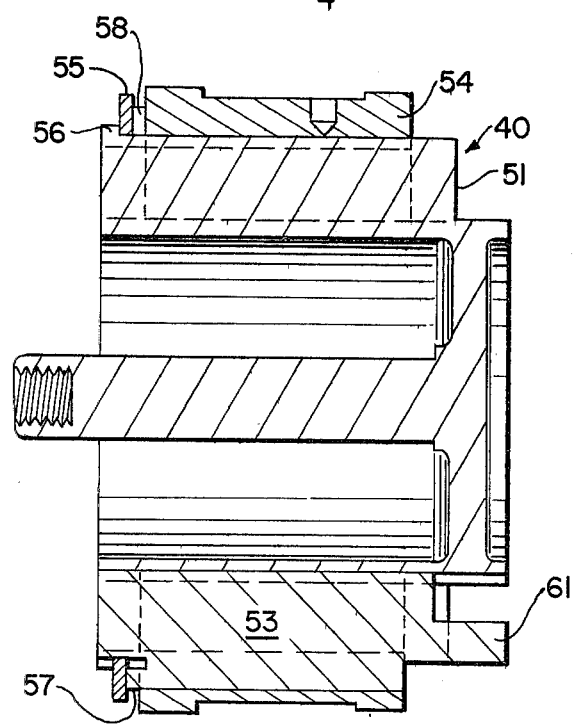
FIG. 4 is a sectional view taken along lines 4—4 in FIG. 3.

Moreover, the permeable flux collector ring 55 shown in FIGS. 1 and 4 further improves the quality of the stop pulses from the coil 17. Specifically, the magnetic circuit associated with the magnets 47 includes the exciter blade 53, the flux collector ring 55, and magnetic shields that are associated with the coil 17. The presence of the flux collector ring 55 about the periphery of the turbine 40 in close association with the coil 17 around its circumference greatly reduces the reluctance of this flux path. As a result a greater percentage of the total flux from the magnets 47 couples the coil 17, so the quality of the stop pulses is improved. Specifically the voltage of the stop pulses, even at low rotor speeds, is reliably detectable.

The flowmeter shown in the FIGURES achieves the objects and advantages of this invention because all the magnetic air gaps are radially extending. While one specific embodiment of this invention has been disclosed, it will be apparent to those of ordinary skill in the art that other embodiments of flowmeters can utilize this invention. For example, other arrangements of exciter blades and magnets could still provide the axially overlapping relationship. Therefore, it is the object of the appended claims to cover all such variations and modifications as come within the true spirit and scope of this invention.

What is claimed as new and desired to be secured by Letters Patent of the United States is:

1. In a mass rate of flow meter including a housing with inlet and outlet ports for defining a flow passage therebetween, swirl generating means in the housing at the input port for imparting angular velocity to a fluid flowing through said housing, a rotor means in the housing having an input end spaced from the swirl generating means and an exit end for conveying fluid from the swirl generator therethrough and for rotating in an unrestrained manner the rotor means including first magnetic means at an input end thereof, sensing coil means disposed on the housing for sensing the passage of the first magnetic means past the first sensing coil to produce a first signal, and restrained turbine means having an input end spaced from the exit end of the rotor means and an output end disposed adjacent to the output port of the housing, the improvement comprising means for sensing the deflection of the restrained turbine, said sensing means including:
   A. Second magnetic means disposed near the periphery of the rotor at the exit end thereof in a predetermined relationship to the first magnetic means for generating magnetic flux,
   B. Magnetic flux linkage means positioned in intermittent radial flux exchange relationship with said second magnetic means, said flux linkage means being disposed on the turbine means at a predetermined, circumferential position and having an end portion extending axially toward the rotor means, said magnetic flux linkage means and said second magnetic means moving in coaxial paths and being partially overlapped axially to define a radial air gap therebetween, when said magnetic flux linkage means and said second magnetic means come into said intermittent relationship, and
   C. Second sensing coil means disposed on the housing and being axially coextensive with at least a portion of said magnetic flux linkage means whereby the passage of said second magnetic means by said magnetic flux linkage means produces a flux change that induces a signal in said second sensing coil means.

2. A mass rate of flow meter as recited in claim 1 wherein the rotor means includes an outer annulus, said second magnetic means including an integral, axially extending, cylindrical support and at least one permanent magnet affixed to said support.

3. In a mass rate of flow meter as recited in claim 2 wherein said turbine means has an outer annulus having a longitudinal slot formed in an outer surface thereof and said linkage means includes an element of a permeable material disposed in said slot that includes a main portion that terminates at the input end of said turbine means and an integral extension disposed in the space between the turbine means and the rotor means to allow the passage of the said second magnetic means thereby.

4. A mass rate of flow meter as recited in claim 1 wherein said second sensing coil means comprises an annular coil about the housing that is axially coextensive with said linkage means.

* * * * *